United States Patent [19]

Wang et al.

[11] Patent Number: 5,458,983
[45] Date of Patent: Oct. 17, 1995

[54] REPOSITIONABLE ACRYLATE ADHESIVE

[75] Inventors: Eric I. Wang, Youngstown; Gary Wilger, Tonawanda, both of N.Y.

[73] Assignee: Moore Business Forms, Inc., Grand Island, N.Y.

[21] Appl. No.: 282,237

[22] Filed: Jul. 29, 1994

[51] Int. Cl.$^6$ .................... C08L 33/02; C08L 33/08; C08L 33/10; B32B 27/30
[52] U.S. Cl. .................... 1505/572; 525/221; 525/227; 525/228
[58] Field of Search .................... 525/228, 227, 525/221; 428/522

[56] References Cited

U.S. PATENT DOCUMENTS

| | | |
|---|---|---|
| H509 | 8/1988 | Chao . |
| Re. 24,906 | 12/1960 | Ulrich . |
| 2,318,429 | 5/1943 | Smith . |
| 2,613,191 | 10/1952 | McGaffin et al. . |
| 3,248,356 | 4/1966 | Snyder . |
| 3,375,121 | 3/1968 | Bildusas . |
| 3,380,938 | 4/1968 | Mistley et al. . |
| 3,392,048 | 7/1968 | Rolik . |
| 3,477,970 | 11/1969 | Beeman . |
| 3,513,120 | 5/1970 | Pohlemann et al. . |
| 3,514,421 | 5/1970 | Kershaw et al. . |
| 3,573,236 | 3/1971 | Barlow . |
| 3,620,988 | 11/1971 | Cohen . |
| 3,661,618 | 5/1972 | Brookman et al. . |
| 3,669,709 | 6/1972 | Kasugai et al. . |
| 3,691,140 | 9/1972 | Silver . |
| 3,769,254 | 10/1973 | Anderson et al. . |
| 3,770,708 | 11/1973 | Knoepfel et al. . |
| 3,857,731 | 12/1974 | Merrill, Jr. et al. . |
| 3,996,181 | 12/1976 | Hayashi et al. . |
| 4,033,918 | 7/1977 | Hauber . |
| 4,049,604 | 9/1977 | Morehouse, Jr. et al. . |
| 4,150,170 | 4/1979 | Lazear et al. . |
| 4,153,776 | 5/1979 | Friedlander et al. . |
| 4,166,152 | 8/1979 | Baker et al. . |
| 4,181,752 | 1/1980 | Martens et al. . |
| 4,254,004 | 3/1981 | Abbey . |
| 4,254,201 | 3/1981 | Sawai et al. . |
| 4,280,942 | 7/1981 | Green . |
| 4,311,759 | 1/1982 | Glennon . |
| 4,322,330 | 3/1982 | Merz et al. . |
| 4,379,201 | 4/1983 | Heilmann et al. . |
| 4,438,232 | 3/1984 | Lee . |
| 4,471,082 | 9/1984 | Kwok et al. . |
| 4,495,318 | 1/1985 | Howard . |
| 4,497,916 | 2/1985 | Cooke et al. . |
| 4,503,184 | 3/1985 | Marongiu . |
| 4,535,124 | 8/1985 | Binsack et al. . |
| 4,598,112 | 7/1986 | Howard . |
| 4,640,727 | 2/1987 | Janssen . |
| 4,645,783 | 2/1987 | Kinoshita . |
| 4,656,218 | 4/1987 | Kinoshita . |
| 4,714,655 | 12/1987 | Bordoloi et al. . |
| 4,735,837 | 4/1988 | Miyasaka et al. . |
| 4,786,696 | 11/1988 | Bohnel . |
| 4,810,763 | 3/1989 | Mallya et al. . |
| 4,820,777 | 4/1989 | Kanda et al. . |
| 4,833,179 | 5/1989 | Young et al. . |
| 4,839,416 | 6/1989 | Orenstein et al. . |
| 4,843,134 | 6/1989 | Kotnour et al. . |
| 4,925,908 | 5/1990 | Bernard et al. . |
| 4,944,888 | 7/1990 | Mallya et al. . |
| 4,946,728 | 8/1990 | Ikeda et al. . |
| 4,952,650 | 8/1990 | Young et al. . |
| 4,966,939 | 10/1990 | Craig . |
| 4,968,562 | 11/1990 | Delgado . |
| 4,988,567 | 1/1991 | Delgado . |
| 4,994,322 | 2/1991 | Delgado et al. . |
| 4,997,877 | 3/1991 | Craig . |
| 5,043,314 | 8/1991 | Suzuki et al. . |
| 5,073,452 | 12/1991 | Satou et al. . |
| 5,079,047 | 1/1992 | Bogaert et al. . |
| 5,100,728 | 3/1992 | Plamthottam et al. . |
| 5,149,586 | 9/1992 | Ishiwata et al. . |

FOREIGN PATENT DOCUMENTS

| | | |
|---|---|---|
| 109177 | 10/1983 | European Pat. Off. . |
| 886003 | 1/1962 | United Kingdom . |

OTHER PUBLICATIONS

Stueben et al., "Ultraviolet Cured Pressure Sensitive Adhesives, I. Acrylate Grafted Polyvinyl Alkyl Ethers," Journal of Radiation Curing, Apr. 1982, pp. 16–19.

Stueben et al., "Utraviolet Cured Pressure Sensitive Adhesives, II. Monoacrylate Grafted Polyethers," Journal of Radiation Curing, Apr. 1982, pp. 20–23.

*Primary Examiner*—Carman J. Seccuro, Jr.
*Attorney, Agent, or Firm*—Finnegan, Henderson, Farrabow

[57] ABSTRACT

An adhesive composition, useful for making a repositionable sheet, which is made up of a mixture of: (a) a polymer prepared by aqueous suspension polymerization of at least one monomer selected from an acrylate, a methacrylate and acrylic acid, the polymer having a geometric mean particle size ranging from about 30 to about 100 microns; and (b) a polymer prepared by aqueous suspension polymerization of at least one monomer selected from an acrylate, a methacrylate and acrylic acid, the polymer having a geometric mean particle size ranging from about 4.1 microns up to about 30 microns.

12 Claims, 4 Drawing Sheets

REPOSITIONABLE ACRYLATE ADHESIVE

BACKGROUND OF INVENTION

1. Field of Invention

The present invention relates to an adhesive composition useful for making a repositionable sheet. The adhesive composition is comprised of acrylate or acrylic polymers having two different particle size distributions. The composition of the invention enables the properties of the adhesive to be varied to meet the particular adhesive specifications for a specific application.

2. Description of Related Art

Polymerizing acrylates and methacrylates to form adhesives is well known in the art. The prior art has long sought adhesive systems that enable the level or amount of tack to be easily varied and controlled. With the constant demand for repositionable labels and sheets, the art is in search of an adhesive that can be used for various types of repositionable labels or sheets. The present invention addresses these needs by providing an adhesive which controls the tackiness, thus making it possible to produce adhesives having the appropriate tack level required in any specific application. In addition, the high costs of reformulation and possible process changes for different products can be avoided with the adhesives of the present invention.

In accordance with the present invention, mixing different-sized adhesive particles produces significant, beneficial results without the difficulty of having to change other parameters, e.g. coat weight or delamination value, for each different batch of adhesive made. The mixture combines characteristics: the adhesive strength of the larger particles with the ease of removal of adhesive from a surface to which it is adhered inherent in the smaller particles.

Adhesive compositions that can be used to produce a repositionable sheet are known in the art. However, such adhesive compositions in the prior art have been composed of polymer components as well as other ingredients such as cross-linkers or fillers. The presence of components other than the polymers can change the properties of the entire batch of adhesive. Adhesive strength and performance may be affected, for example. Therefore, when adhesive compositions contain these other ingredients, the adhesive generally has to be reformulated for each different product line, adding greatly to the manufacturing cost.

U.S. Pat. No. 4,645,783 to Kinoshita discloses a repeatedly usable and releasable sheet coated with an adhesive composition comprising microspherical copolymer particles (A) with an average diameter of 10-100 microns prepared by aqueous suspension polymerization of alkyl acrylate esters, α-mono-olefin carboxylic acids, and vinyl monomers; and polymer microparticles (B) with an average diameter of 0.1–4.0 microns prepared by polymerization of vinyl monomers in an aqueous medium. The adhesive composition of Kinoshita also contains other ingredients, such as surfactants and a protective protein colloid. In order for Kinoshita to achieve the requisite small size of the (B) particles, a large amount of energy had to be expended.

SUMMARY OF INVENTION

Accordingly, the present invention is directed to an adhesive composition useful for making a repositionable sheet that can achieve the desired stainless steel peel (a test for adhesive strength; see Detailed Description, below) and delamination values necessary for a satisfactory repositionable sheet. The adhesive composition is made up of a mixture of: (a) a polymer prepared by aqueous suspension polymerization of at least one monomer selected from an acrylate, a methacrylate and acrylic acid, said polymer having a geometric mean particle size ranging from about 30 to about 100 microns; and (b) a polymer prepared by aqueous suspension polymerization of at least one monomer selected from an acrylate, a methacrylate and acrylic acid, said polymer having a geometric mean particle size ranging from about 4.1 microns up to about 30 microns. Because of the range of particle sizes possible in the mixture, various levels of peel value or adhesion may be reached, depending on the requirements of the application.

This invention is also directed to a method of modifying the adhesive characteristics of a polymeric composition with components (a) and (b) as described above, the method comprising the steps of adjusting the average particle sizes of components (a) and (b) and then adjusting the weight ratios of components (a) to (b) in order to achieve an adhesive composition with the desired properties for the intended application.

DETAILED DESCRIPTION OF PREFERRED EMBODIMENTS

Figure 1:
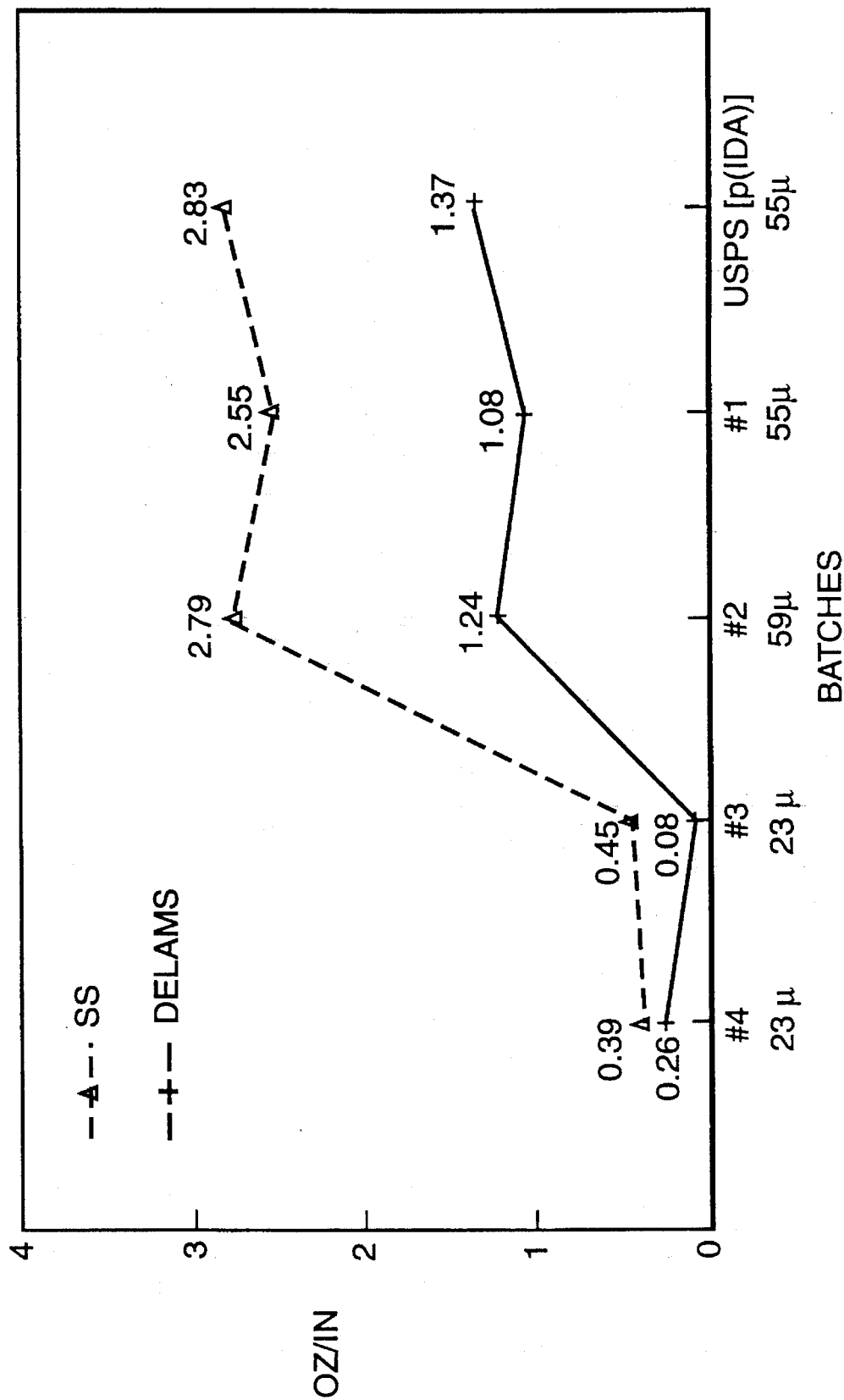
FIG. 1 illustrates the two week delamination and stainless steel peel values of sample batches of adhesive compositions.

The present invention relates to an adhesive composition useful to produce a repositionable sheet. The composition comprises a mixture of (a) a polymer prepared by aqueous suspension polymerization of at least one monomer selected from an acrylate, a methacrylate, or acrylic acid, such polymer having a geometric mean particle size ranging from about 30 to about 100 microns and (b) a polymer prepared by aqueous suspension polymerization of at least one monomer selected from an acrylate, a methacrylate, or acrylic acid, such polymer having a geometric mean particle size ranging from about 4.1 to about 30 microns.

Component (a), with its larger particle size, is a high adhesion, or more tacky, adhesive. The preferred geometric mean particle size range for the high adhesion adhesive component is from about 35 to about 100 microns, and more preferably, from about 40 to about 100 microns. Still more preferably, the geometric mean size range is from about 40 to about 65 microns, and most preferably the geometric mean particle size for component (a) is about 55 microns. The acrylate monomers/co-monomers which may comprise component (a) include (1) an acrylic acid ester such as methyl acrylate, ethyl acrylate, propyl acrylate, n-butyl acrylate, isobutyl acrylate, n-octyl acrylate, dodecyl acrylate, isodecyl acrylate, 2-ethylhexyl acrylate, stearyl acrylate, phenyl acrylate, or alpha-chloromethyl acrylate; (2) a methacrylic acid ester such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, alpha chloromethyl methacrylate, dimethylaminoethyl methacrylate, diethylaminoethyl methacrylate or glycidyl methacrylate. In addition, alpha, beta-unsaturated carboxylic acids such as acrylic acid or methacrylic acid can be used.

Component (b), with its smaller particle size, is a low adhesion, or less tacky, adhesive. The less tacky adhesives or non tacky polymer emulsions can be prepared by using exactly the same formulation as for regular repositionable adhesives but producing a geometric mean particle size no larger than 30 microns. Emulsion polymerization can also be used, though suspension polymerization is preferred. A preferred geometric mean particle size range for component (b) is from about 4.1 to about 25 microns, with a more preferred geometric mean particle size range being from about 10 to about 25 microns. Still more preferred is a geometric mean particle size range of from about 15 to about 25 microns, and most preferred as a geometric mean particle size range for component (b) is about 20–25 microns. The acrylate monomers/co-monomers which may comprise component (b) are those listed above for component (a).

Preferably, each of components (a) and (b) is a polymer of 2-ethyl hexyl acrylate. In another preferred embodiment, (a) is a copolymer of 2-ethyl hexyl acrylate and acrylic acid and (b) is a polymer of 2-ethyl hexyl acrylate. Also preferred is an embodiment where both (a) and (b) are polymers of isooctyl acrylate. In another preferred embodiment, (a) is a copolymer of isooctyl acrylate and acrylic acid and (b) is a polymer of isooctyl acrylate. In a further preferred embodiment, both (a) and (b) are polymers of isodecyl acrylate. In yet another preferred embodiment, (a) is a copolymer of isodecyl acrylate and acrylic acid and (b) is a polymer of isodecyl acrylate.

The weight ratio of component (a) to component (b) ranges from about 80:20 to about 25:75. Preferably, the weight ratio ranges from about 75:25 to 55:45, and most preferably, the weight ratio of component (a) to component (b) is about 70:30. The preferred ratio is a ratio of component (a) to component (b) particles that, when coated onto a substrate, would produce the best delamination and stainless steel peel values for a particular application, without changing any chemical formulations or written specifications, i.e., coat weight.

In accordance with the invention, the adhesive composition is applied onto a substrate, or portion thereof, thus comprising a repositionable sheet or label. The sheet or label is then tested for adhesive strength. The tests for adhesive strength are standard in the art. The stainless steel peel test was established by the Tag and Label Manufacturers Institute (TLMI) and tests adhesive strength. Peel adhesion is the force required to remove a pressure sensitive label from a standard test panel (stainless steel) at a specified angle and speed after the label has been applied to the test panel under specified conditions. The delamination of the label from the test surface is a function of this test.

The production of the adhesive composition of the present invention is illustrated by way of the following examples. It is to be understood that the invention is not to be limited to the specific conditions or details set forth in these examples except insofar as such limitations are specified in the appended claims.

EXAMPLE 1

Four one-hundred (100) gallon batches of adhesive were prepared. Polyvinyl alcohol was used as a suspension agent during polymerization to keep microparticles away from each other to avoid agglomeration. LUPERSOL 554-M75 initiator (tradename for Atochem's t-amyl peroxypivalate), was used in combination with LUCIDOL-70 (a partially hydrolyzed benzoyl peroxide from Atochem) for all batches.

BATCH 1

Adhesive Formulation (40% Solids)

| | |
|---|---|
| 2-ethylhexyl acrylate monomer (BASF 2-EHA) | 320 lbs |
| Polyvinyl alcohol (PVA) (Grade 523, 10% solids) | 90 lbs |
| Deionized Water ($H_2O$) | 390 lbs |
| Initiator #1 (LUPERSOL 554-M75) (Level: active 0.12; actual 0.15%) | 218 gms |
| Initiator #2 (LUCIDOL-70 Benzoyl Peroxide) (Level: active 0.035; actual 0.05%) | 73 gms |

The deionized water and the polyvinyl alcohol were charged into a 100-gallon reactor tank in that order. The passage of nitrogen was begun, and the contents of the tank were stirred until the air had been replaced by nitrogen, about 30–45 minutes. A nitrogen blanket was maintained during the entire polymerization reaction. The appropriate levels of the initiators were then added to the 2-EHA monomer and mixed until the initiators were entirely dissolved. To take advantage of the lower starting exotherm temperature from LUPERSOL 554-M75, LUPERSOL was used in combination with LUCIDOL-70. The 2-EHA solution was then added to the aqueous charge in the tank.

The mechanical stirrer was set to the RPM corresponding to the desired particle size range. For Batch 1, the setting was about 490 RPM using a 7-inch marine propeller. The reactor tank was then heated. The solution was allowed to react at 124.1°–145.1° F. The heat-up or induction time was 62 minutes. The polymerization reaction began at 145.1° F. and lasted for 12 minutes. The reaction temperature was 172.3° F. When polymerization was essentially complete, the temperature began to drop slowly. The mixture was then heated for 2 hours to reduce any residual monomer. Finally the mixture was cooled to 25°–30° C. Microparticles having a geometric mean particle size of about 55.3 microns were obtained; the microparticles had a normal distribution with a standard deviation of 15–21 microns.

BATCH 2

Using the apparatus and procedure described for Batch 1, Batch 2 was made. The mechanical stirrer was set to 490 RPM using a 7-inch marine propeller. The solution was allowed to react at 131.5°–145.4° F. The heat-up time was 35 minutes. The polymerization reaction began at 145.4° F. and lasted for 16 minutes. The reaction temperature was 191.0° F. When polymerization was essentially complete, the temperature began to drop slowly. The mixture was then heated for 2 hours to reduce any residual monomer. Finally the mixture was cooled to 25°–30° C. Microparticles having a geometric mean particle size of about 59.1 microns were obtained; the microparticles had a normal distribution with a standard deviation of 15–21 microns.

BATCH 3

Batch 3 was made using the apparatus and procedure described for Batch 1. The mechanical stirrer was set to 1000 RPM using an 8-inch turbine blade. The solution was allowed to react at 140°–146.1° F. The mixture was heated for 86 minutes. The polymerization reaction began at 146.1° F. and lasted for 10 minutes. The reaction temperature was 173.2° F. When polymerization was essentially complete, the temperature began to drop slowly. The mixture was then heated for 2 hours to reduce any residual monomer. Finally the mixture was cooled to 25°–30° C. Microparticles having a geometric mean particle size of about 22.9 microns were obtained; the microparticles had a normal distribution with a standard deviation of 5–7 microns.

BATCH 4

Batch 4 was made using the apparatus and procedure described in Batch 1. The mechanical stirrer was set to 1000 RPM using an 8-inch turbine blade. The solution was allowed to react at 140°–146.7° F. The mixture was heated for 67 minutes. The polymerization reaction began at 146.7° F. and lasted for 6 minutes. The reaction temperature was 194.2° F. When polymerization was essentially complete, the temperature began to drop slowly. The mixture was then heated for 2 hours to reduce any residual monomer. Finally the mixture was cooled to 25°–30° C. Microparticles having a geometric mean particle size of about 22.7 microns were obtained; the microparticles had a normal distribution with a standard deviation of 5–7 microns.

EXAMPLE 2

The four batches of adhesive from Example 1 were tested with and without 1% Acrysol™ ASE-60 (thickening agent) added into the slurries. The coated samples of four batches were tested initially after coating and then again at 3 days, 1 week, and 2 weeks for functional properties. The adhesive with small particle size produced low delamination and stainless steel peel values, whereas the adhesive containing the large particle size produced high values. Table 1 shows the average values after 2 weeks, with 1% Acrysol™ ASE-60, as compared to a control adhesive comprising poly(isodecyl acrylate) [p(IDA)] which is typically used for the U.S. Postal Service (USPS) label application. See FIG. 1 also. Table 2 shows the average values after 2 weeks without 1% Acrysol™ ASE-60.

TABLE 1

Results with ASE 60 added into the adhesive

| BATCH | DELAM | STAIN-LESS | MICRON | POLY-MERIZATION TEMPERATURE |
|---|---|---|---|---|
| p (IDA) | 1.37 | 2.83 | 55 | 190° F. |
| 1 | 1.08 | 2.55 | 55.3 | 175° F. |
| 2 | 1.24 | 2.79 | 59.1 | 190° F. |
| 3 | 0.08 | 0.45 | 22.9 | 175° F. |
| 4 | 0.26 | 0.39 | 22.7 | 190° F. |

TABLE 2

Results without ASE 60 added into the adhesive

| BATCH | DELAM | STAIN-LESS | MICRON | POLY-MERIZATION TEMPERATURE |
|---|---|---|---|---|
| p (IDA) | 1.03 | 2.83 | 55 | 190° F. |
| 1 | 0.59 | 3.23 | 55.3 | 175° F. |
| 2 | 0.88 | 3.68 | 59.1 | 190° F. |
| 3 | 0.03 | 0.47 | 22.9 | 175° F. |
| 4 | 0.05 | 0.52 | 22.7 | 190° F. |

EXAMPLE 3

Four samples, batches 1–4 as described in Example 1, were tested on the RDA2 rheometer. The purpose was to measure selected rheological properties, e.g. the dynamic elastic modulus G' and the loss tangent factor tanδ, for the four adhesive samples as a function of frequency and temperature. The data shown below illustrates that there are different functional properties for the four batches as a function of different particle size. G' relates to the elasticity of a given material; tanδ is the ratio of G" (viscous modulus) to G' (elastic modulus). Samples represent two different particle sizes prepared at two different polymerization/reaction temperatures. The following table summarizes the reaction temperatures and particle sizes for this sample set.

TABLE 3

| | Sample Description | |
|---|---|---|
| SAMPLE NAME | REACTION TEMP | PARTICLE SIZE (MICRONS) |
| 1 | 175° F. | 55.3 |
| 2 | 190° F. | 59.1 |
| 3 | 175° F. | 22.9 |
| 4 | 190° F. | 22.7 |

Strain sweeps, frequency sweeps, and temperature ramps were performed on the four samples using the 7.9 mm diameter parallel plate geometry of the RDA-2 rheometer. For the strain sweeps, the strain was varied from 0.0 to 10.0%, the frequency was constant at 6.28 rad/sec, and the temperature was constant at 60° C.

For the frequency sweeps, the frequency was varied from 0.1 to 100 rad/sec, the temperature was constant at 60° C., and the strain amplitude was constant at 2.5%. Four runs were performed for each sample, and the average values of G' and tanδ at 0.1 rad/sec are presented below in Table 4.

For the temperature ramps, the temperature was ramped from 120° C. to approximately 220° C. using a heating rate of 2° C./min. The frequency was constant at 1 Hz and the initial strain amplitude was 5%.

TABLE 4

Freqency Sweep Data Averages at 60° C., 0.1 rad/sec

| SAMPLE NAME | AVG. tanδ | AVG. G' (dyn/cm2) |
|---|---|---|
| 1 | 0.4229 | 4.518e + 05 |
| 2 | 0.4183 | 3.792e + 05 |
| 3 | 0.4318 | 6.733e + 05 |
| 4 | 0.4524 | 6.904e + 05 |

Figure 2:
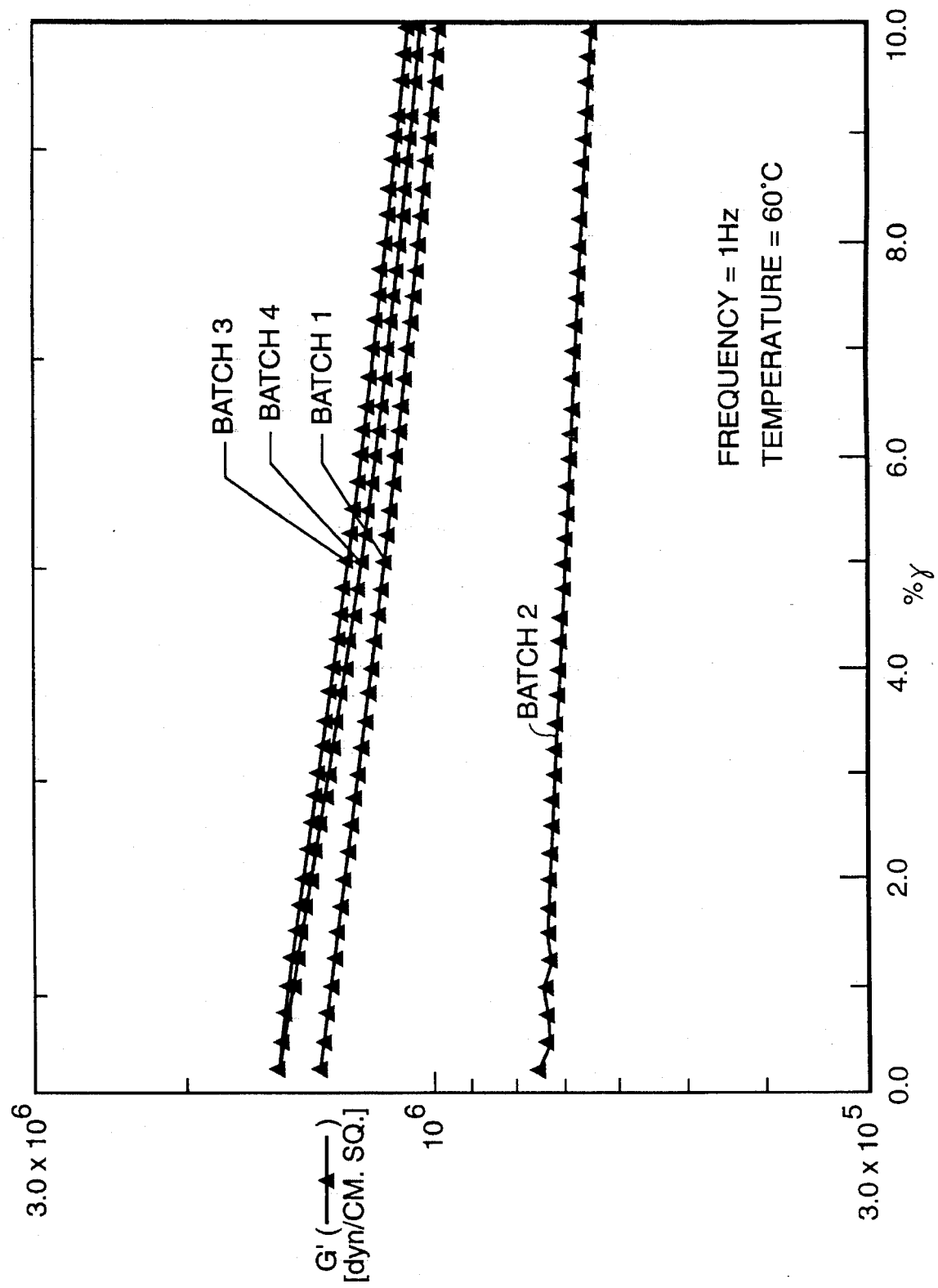
FIG. 2 compares sample batches of adhesive, each having a different particle size, on the basis of G' (elastic modulus) as a function of percent strain.
Figure 3:
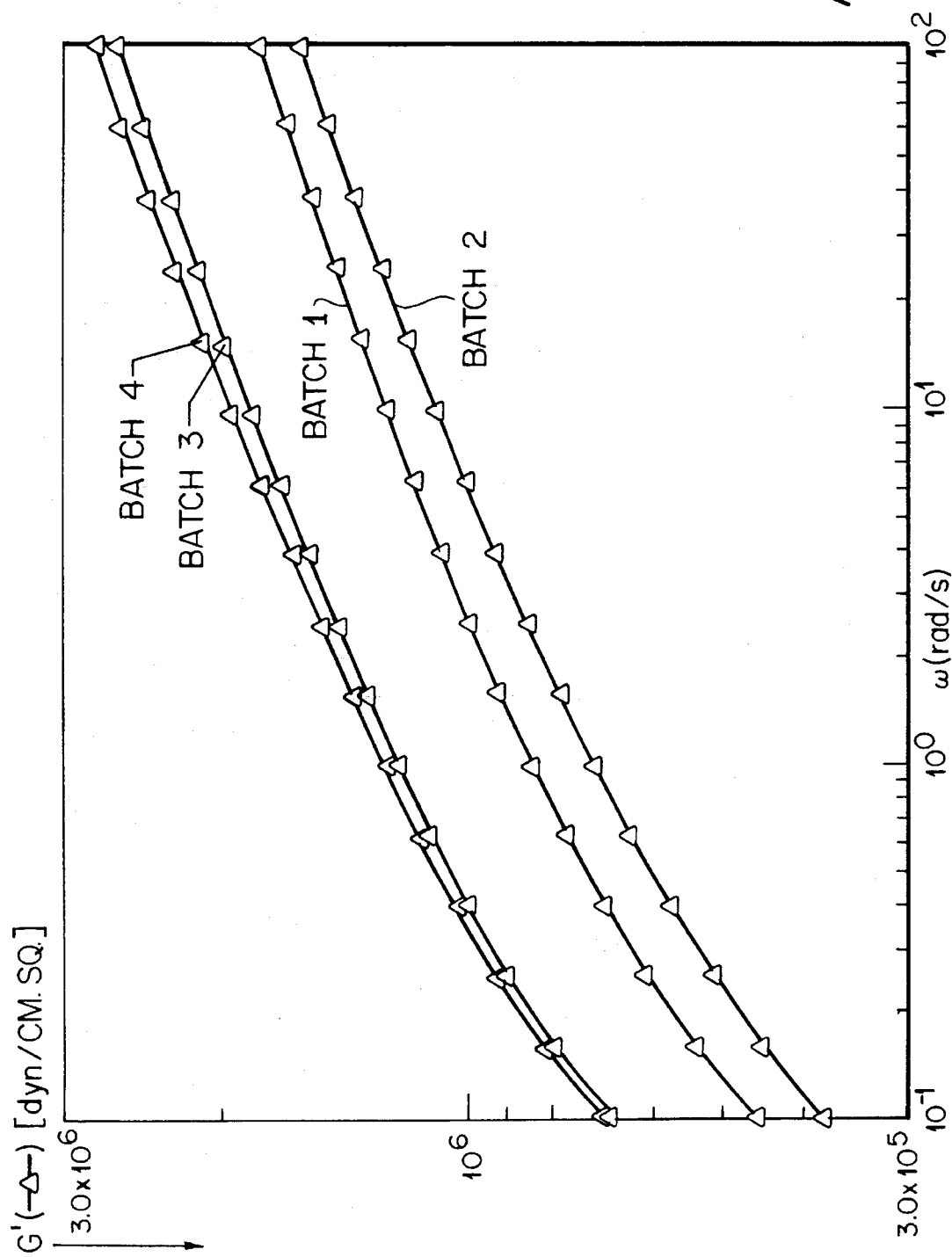
FIG. 3 compares sample batches of adhesive on the basis of G' as a function of frequency.

FIG. 2 compares the four samples on the basis of G' as a function of percent strain. FIG. 3 compares the four samples on the basis of G' as a function of frequency. The value of G' decreased with increasing particle size in both cases, as evidenced by samples 1 and 2, which have larger particle sizes and show decreased values of G' in both graphs.

EXAMPLE 4

Batches 2 and 4 of Example 1, Batch 2 with particles of approximately 60 microns and Batch 4 of 23 microns, were blended together at ratios of 70/30, 50/50, and 30/70. Each batch and the three blends were coated and run on a 20-lb stock paper substrate. The coating weight was determined from the initial samples (see Table 5). The remaining samples were placed into the oven which was set at 120° F. and after 3 days, 1 week, and 2 weeks, were tested on the TLMI. The ratio of 70/30 produced the best functional results, i.e., the most desirable delamination and stainless steel peel values, in, for example, one of the USPS label applications.

TABLE 5

| | Two week results: Average Values | | |
|---|---|---|---|
| BATCH | DELAM (oz/in) | STAINLESS (oz/in) | COAT WT (lb/ream) |
| p (IDA) | 1.32 | 3.44 | 1.47 |
| 2 | 1.20 | 3.10 | 1.47 |
| 4 | 0.04 | 0.34 | 1.33 |
| 70/30 | 0.66 | 2.28 | 1.28 |
| 50/50 | 0.51 | 2.12 | 1.26 |
| 30/70 | 0.28 | 1.29 | 1.40 |

Figure 4:
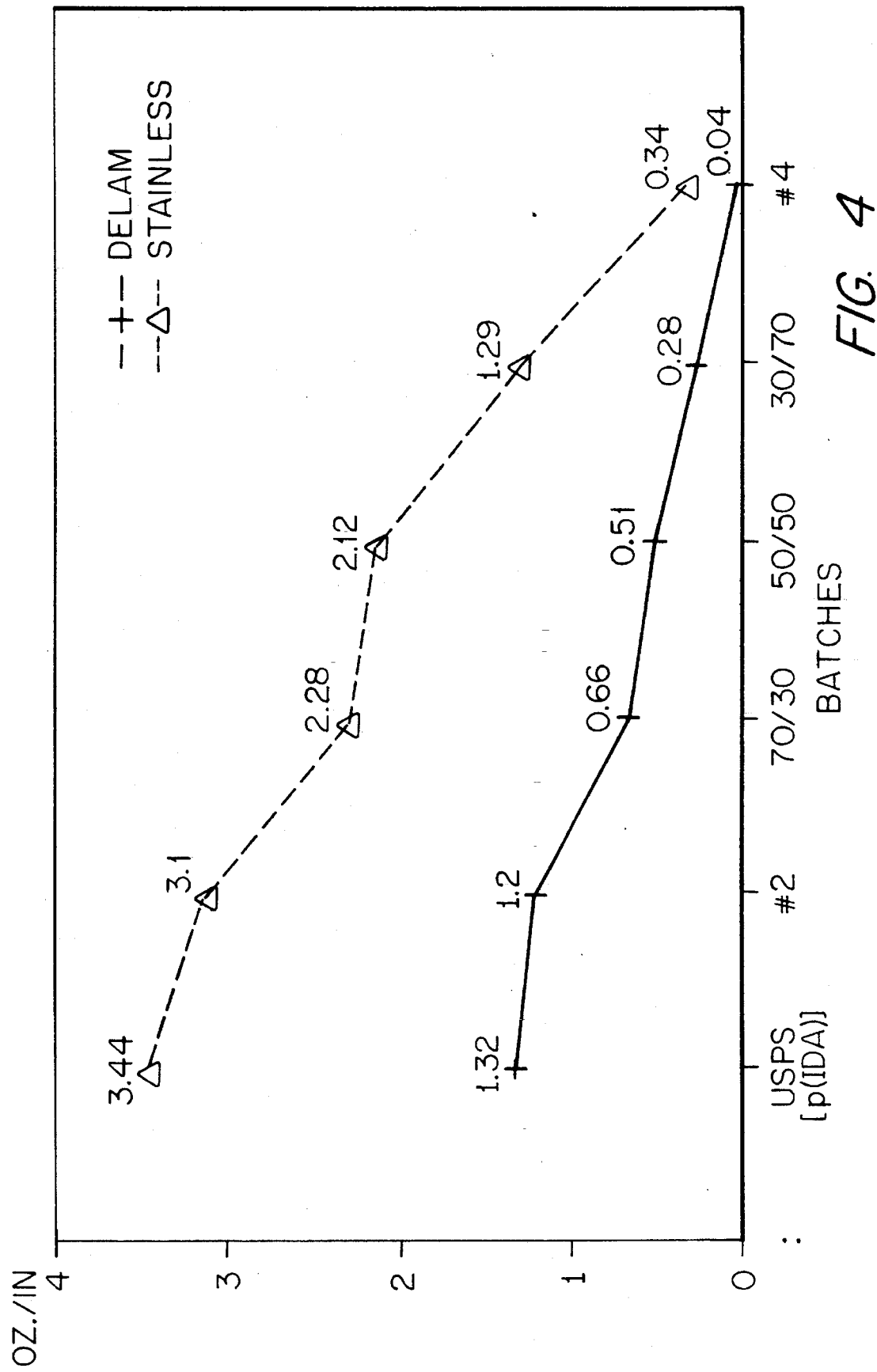
FIG. 4 illustrates the two week delamination and stainless steel peel values of sample batches of adhesive compositions and blends of these batches.

A "ream" is equal to 1300 square feet. See also FIG. 4.

We claim:

1. An adhesive composition comprising a mixture of:
  (a) a polymer of at least one monomer selected from an acrylate, a methacrylate and acrylic acid, said polymer having a first particle size distribution with a geometric mean particle size ranging from greater than 30 microns to about 100 microns; and
  (b) a polymer of at least one monomer selected from an acrylate, a methacrylate and acrylic acid, said polymer having a second particle size distribution with a geometric mean particle size ranging from about 10 microns up to 30 microns;
wherein the weight ratio of component (a) to component (b) in said adhesive composition ranges from about 80:20 to about 25:75.

2. The adhesive composition of claim 1, wherein the polymer of (a) and the polymer of (b) are prepared by aqueous suspension polymerization.

3. The adhesive composition of claim 1, wherein the weight ratio of component (a) to component (b) ranges from about 75:25 to about 55:45.

4. The adhesive composition of claim 3, wherein the weight ratio of component (a) to component (b) is about 70:30.

5. The adhesive composition of claim 1, wherein each of components (a) and (b) is a polymer of 2-ethyl hexyl acrylate.

6. The adhesive composition of claim 1, wherein component (a) is a copolymer of 2-ethyl hexyl acrylate and acrylic acid and component (b) is a polymer of 2-ethyl hexyl acrylate.

7. The adhesive composition of claim 1, wherein each of components (a) and (b) is a polymer of isooctyl acrylate.

8. The adhesive composition of claim 1 wherein component (a) is a copolymer of isooctyl acrylate and acrylic acid and component (b) is a polymer of isooctyl acrylate.

9. The adhesive composition of claim 1, wherein each of components (a) and (b) is a polymer of isodecyl acrylate.

10. The adhesive composition of claim 1 wherein component (a) is a copolymer of isodecyl acrylate and acrylic acid and component (b) is a polymer of isodecyl acrylate.

11. A repositionable sheet comprising:
  a substrate; and
  the adhesive composition of claim 1 applied onto at least a portion of the substrate.

12. A method of modifying the adhesive characteristics of a polymeric composition wherein said composition comprises
  (a) a polymer of at least one monomer selected from an acrylate, a methacrylate and acrylic acid, said polymer having a first particle size distribution with a geometric mean particle size ranging from greater than 30 microns to about 100 microns; and
  (b) a polymer of at least one monomer selected from an acrylate, a methacrylate and acrylic acid, said polymer having a second particle size distribution with a geometric mean particle size ranging from about 10 microns up to 30 microns;
the method comprising the steps of:
  adjusting the average particle size distributions of components (a) and (b) of said polymeric composition within the above defined ranges; and
  adjusting the weight ratios of component (a) to component (b) of said polymeric composition so that the weight ratio of component (a) to component (b) in said polymer composition ranges from about 80:20 to about 25:75 in order to achieve the desired tackiness.

* * * * *